United States Patent
Davis et al.

(10) Patent No.: US 10,214,264 B2
(45) Date of Patent: Feb. 26, 2019

(54) FOOT CLAMPING AND LOCKING MECHANISM WITH AUTO-RELEASE FOR A PEDAL

(71) Applicant: Vectus Sport, San Jose, CA (US)

(72) Inventors: Greg William Davis, San Jose, CA (US); Robert E. Glaspie, Tehachapi, CA (US)

(73) Assignee: Vectus Sport, San Jose, CA (US)

( * ) Notice: Subject to any disclaimer, the term of this patent is extended or adjusted under 35 U.S.C. 154(b) by 21 days.

(21) Appl. No.: 15/353,589

(22) Filed: Nov. 16, 2016

(65) Prior Publication Data

US 2018/0281894 A1  Oct. 4, 2018
US 2019/0016410 A9  Jan. 17, 2019

(51) Int. Cl.
*B62M 3/08*  (2006.01)

(52) U.S. Cl.
CPC .................................. *B62M 3/083* (2013.01)

(58) Field of Classification Search
CPC ........ B62M 3/08; B62M 3/083; B62M 3/086; B62M 3/16; Y10T 74/2168; Y10T 74/217
See application file for complete search history.

(56) References Cited

U.S. PATENT DOCUMENTS

| | | | | |
|---|---|---|---|---|
| 557,025 A * | 3/1896 | Ruden | .................... | B62M 3/086 |
| | | | | 74/594.6 |
| 570,778 A * | 11/1896 | Stannard | ................ | B62M 3/086 |
| | | | | 74/594.6 |
| 602,516 A * | 4/1898 | McDaniel | .............. | B62M 3/086 |
| | | | | 74/594.6 |
| 615,679 A * | 12/1898 | Condell | ................. | B62M 3/086 |
| | | | | 74/594.6 |
| 638,407 A * | 12/1899 | Wheeler | ................ | B62M 3/086 |
| | | | | 74/594.6 |
| 4,889,010 A * | 12/1989 | Ross | ...................... | B62M 3/083 |
| | | | | 74/594.1 |
| 2011/0048165 A1* | 3/2011 | Lee | .......................... | B62M 3/08 |
| | | | | 74/594.6 |

* cited by examiner

*Primary Examiner* — Richard W Ridley
*Assistant Examiner* — Brian J McGovern
(74) *Attorney, Agent, or Firm* — Fenwick & West LLP

(57) ABSTRACT

A foot clamping and locking mechanism with an auto-release for releasably securing a user's foot to a pedal may include a pedal comprising a pedal base having a top plate; an arm extending from the pedal; a cuff attached to the arm, the cuff sized to wrap over top of a user's foot; and a trigger extending upward from the top plate, the trigger operatively attached to the arm such that, when the user steps on the trigger, the arm causes the cuff to lock down onto the user's foot.

6 Claims, 6 Drawing Sheets

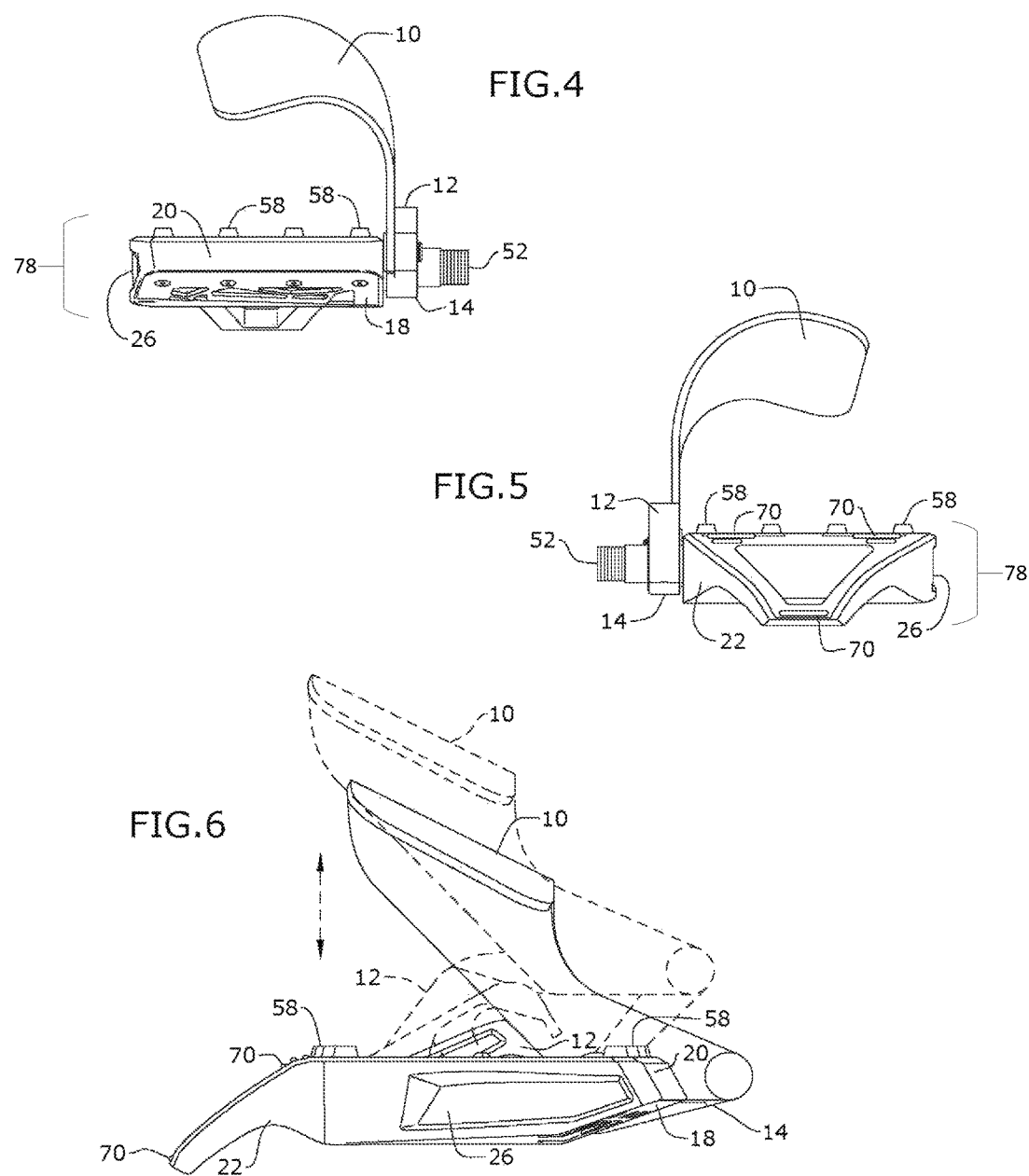

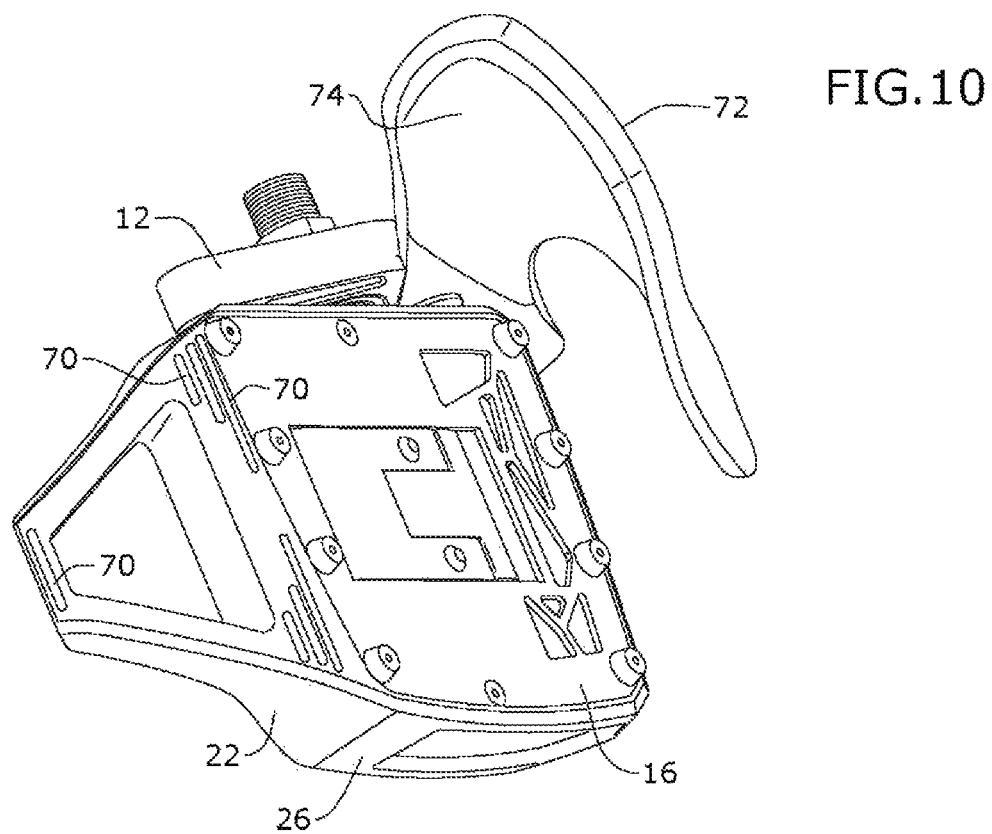
FIG.10
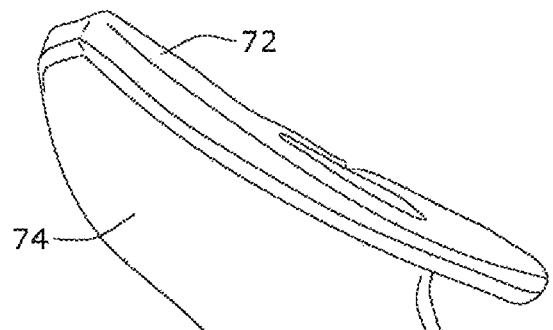
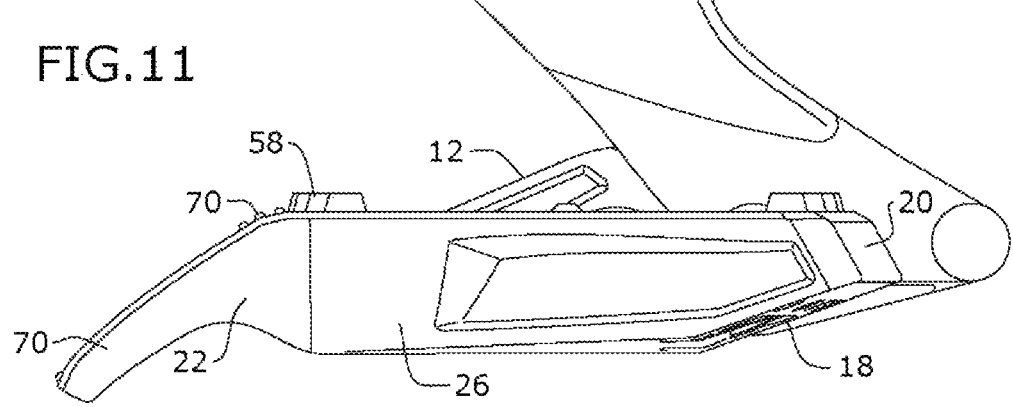
FIG.11

FOOT CLAMPING AND LOCKING MECHANISM WITH AUTO-RELEASE FOR A PEDAL

RELATED APPLICATION

This application claims priority to provisional patent application U.S. Ser. No. 62/386,081 filed on Nov. 16, 2015 entire contents of which is herein incorporated by reference.

BACKGROUND

The embodiments herein relate generally to foot pedals, and more particularly, to a foot clamping and locking mechanism that includes an auto-release and is designed to releasably secure a user's foot to a pedal, platform, or foothold area of any vehicle or piece of equipment.

Pedals, such as pedals on bicycles or other exercise equipment, are used by a user placing his or her feet on the pedals. Some devices, such as toe clips with straps and clipless pedals designed to work with special shoes having matching cleats, exist to help secure a foot to a pedal. However, it can be difficult for a user to release his or her foot from the existing devices quickly and easily. In such instances, users may be unable to bail out of the conventional devices in an emergency situation, thus causing a fall or other injuries.

Therefore, what is needed is a mechanism for quickly and easily releasably securing a user's foot to a pedal, wherein the mechanism does not require special shoes with matching cleats to connect to the pedals.

SUMMARY

Some embodiments of the present disclosure include a foot clamping and locking mechanism with an auto-release for releasably securing a user's foot to a pedal that is attached to a bicycle, motorcycle, various types of exercise equipment, or any other piece of equipment requiring a user's foot to be held securely in place, and may include a pedal comprising a pedal base having a top plate; an arm extending from the pedal; a cuff attached to the arm, the cuff sized to wrap over top of a user's foot; and a trigger extending upward from the top plate, the trigger operatively attached to the arm such that, when the user steps on the trigger, the arm causes the cuff to lock down onto the user's foot. Because of the structure of the device, a user may be able to release his or her foot from the clamping and locking mechanism by simply pulling the foot to the side opposite the arm or by pulling his or her foot rearward out of the cuff.

BRIEF DESCRIPTION OF THE FIGURES

The detailed description of some embodiments of the invention is made below with reference to the accompanying figures, wherein like numerals represent corresponding parts of the figures.

FIG. 4 is a front view of one embodiment of the present disclosure.

FIG. 5 is a back view of one embodiment of the present disclosure.

FIG. 6 is a left side view of one embodiment of the present disclosure.

FIG. 10 is a top perspective view of one embodiment of the present disclosure.

FIG. 11 is a left side view of one embodiment of the present disclosure.

DETAILED DESCRIPTION OF CERTAIN EMBODIMENTS

Figure 1:
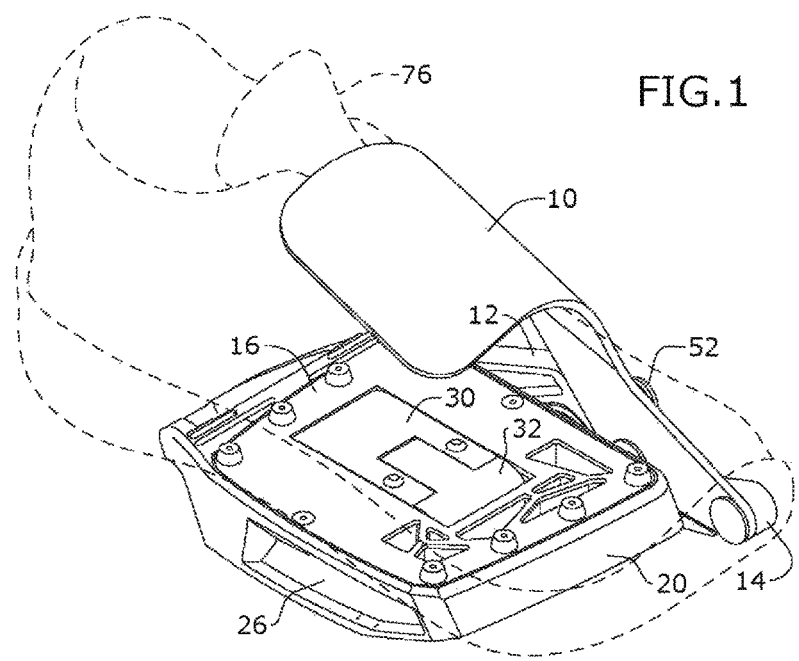
FIG. 1 is a perspective view of one embodiment of the present disclosure, shown in a closed position.
Figure 2:
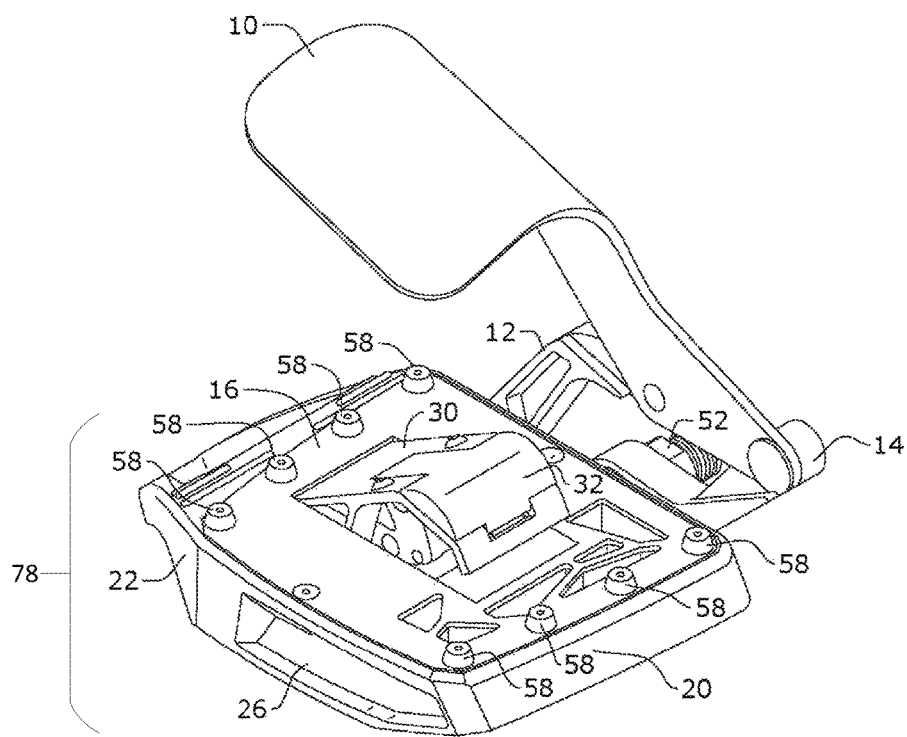
FIG. 2 is a perspective view of one embodiment of the present disclosure, shown in an open position.
Figure 3:
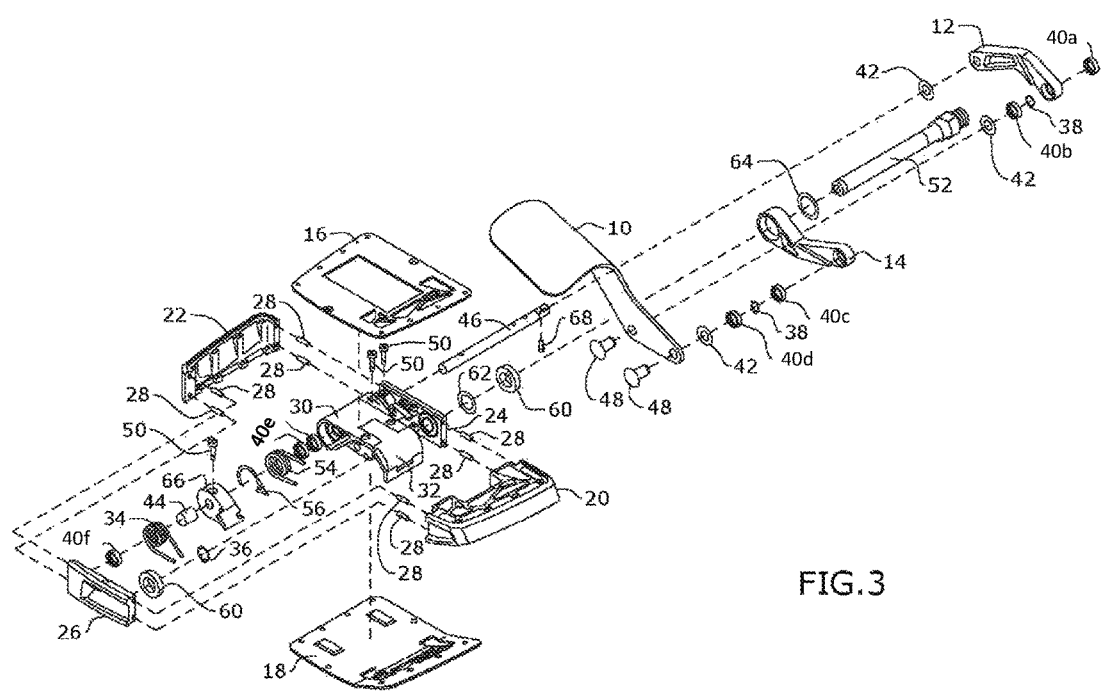
FIG. 3 is an exploded view of one embodiment of the present disclosure.
Figure 7:
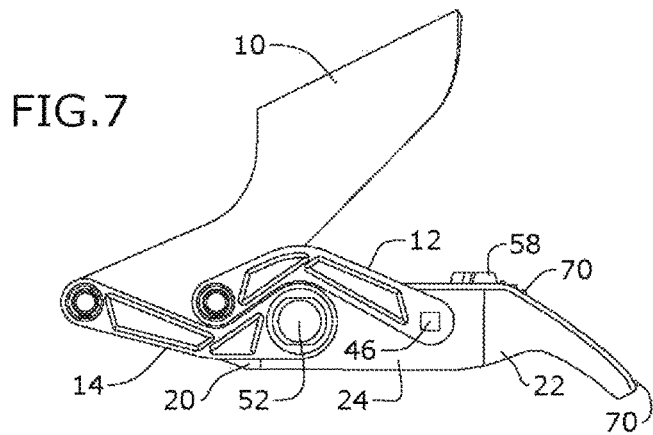
FIG. 7 is a right side view of one embodiment of the present disclosure.
Figure 8:
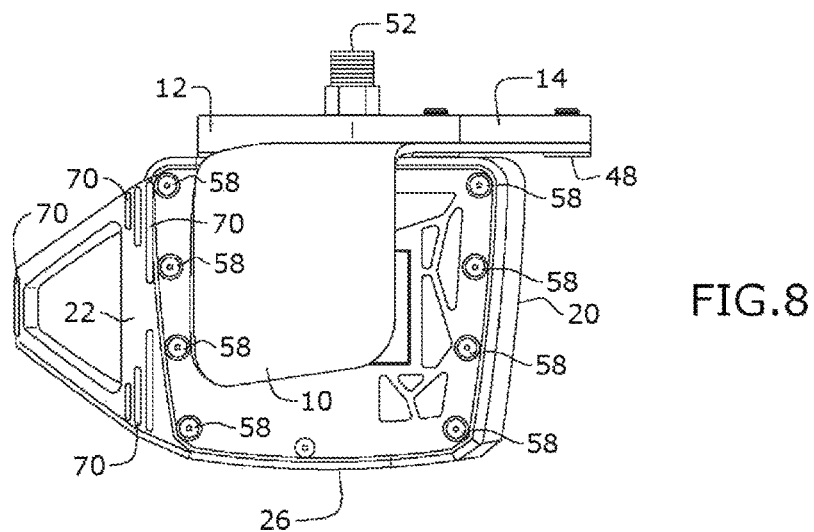
FIG. 8 is a top view of one embodiment of the present disclosure.
Figure 9:
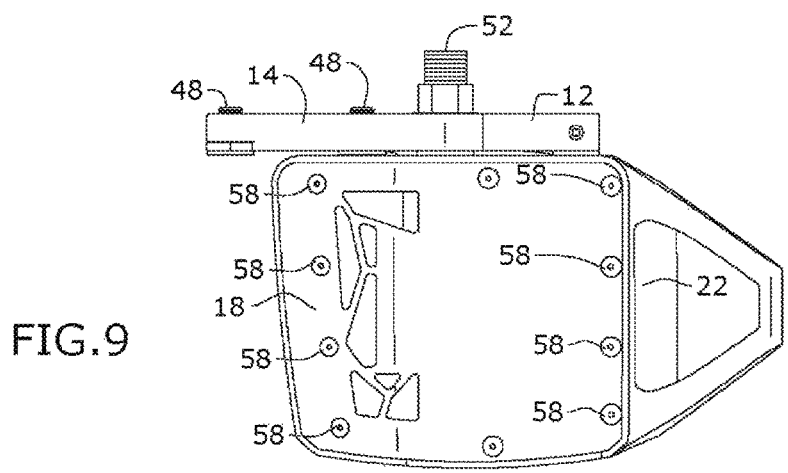
FIG. 9 is a bottom view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used to releasably secure a user's foot to a pedal and may comprise the following elements: (1) pedal; (2) cuff; (3) arm; and (4) trigger. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the device of the present disclosure may be related in the following exemplary fashion. It is not intended to limit the scope or nature of the relationships between the various elements and the examples are presented as illustrative examples only.

By way of example, and referring to FIGS. 1-11, some embodiments of the present disclosure include a clamping and locking device with an auto-release for securing a user's foot, the device comprising a pedal 78 having a top plate 16, an arm, such as a top arm 12 rotatably attached to a bottom arm 14, extending from the pedal 78; a cuff 10 attached to the arm, the cuff 10 sized to wrap over top of a user's foot or shoe 76; and a trigger 32 extending upward from the top plate 16, the trigger 32 operatively attached to the arm such that, when the user steps on the trigger 32, the arm causes the cuff 10 to lock down onto the user's foot. The top arm including a first arm end coupled to a portion of the rod and a second arm end attached to the cuff.

As shown in the Figures, the pedal 78 may comprise a pedal base 84 comprising a top plate 16, a front panel 20 extending downward from the top plate 16 proximate to a user's toes when in use, a left (e.g., first) panel 26 extending downward from one side edge of the top plate 16, a right (e.g., second) panel 24 extending downward from one side edge of the top plate 16 opposite the left panel 26; and a back panel 22 extending downward from top plate 16 opposite the front panel 20. A bottom plate 18 may attach to the bottom edge of each of the front panel 20, the left panel 26, the right panel 24, and the back panel 22. In some embodiments, such as that shown in FIG. 3, the back panel 22 may be substantially flat, while in other embodiments, such as those shown in FIGS. 5-11, the back panel 22 may comprise a substantially triangular-shaped tab, which may help for uprighting or positioning the pedal for easy entry of the user's foot. In embodiments, an upper surface of the back panel 22 may comprise a plurality of raised grips 70, and an upper surface of the top plate 16 may comprise a plurality of cleats 58 extending outwardly therefrom.

The top plate 16 may have a foot flap 30 extending upwardly therefrom when not in use. A trigger 32 may be rotatably attached to the foot flap 30, such that when a user steps on the foot flap 30 and trigger 32, the foot flap 30 rotates downward, forming a substantially flat surface that aligns with an upper surface of the top plate 16, as shown in FIG. 1.

Extending from either the left panel 26 or the right panel 24 may be a main drive pin 52, wherein the main drive pin 52 is designed to attach to, for example, a bicycle crank arm or other exercise equipment. As shown in the Figures, the main drive pin 52 may extend from an inner surface of the left panel 26 through a pin bearing 60 and a pin gasket 36; under the trigger 32; through the right panel 24, a first pin washer 62, and a pin bearing 60; under the cuff 10, and through an orifice in the bottom arm 14 and a second pin washer 64. The end of the main drive pin 52 distal from the pedal 78 may attach to the crank arm (not shown).

The top arm 12 may attach to the cuff 10 using any suitable fastener. For example, a flange bushing 48 may extend through a bushing orifice in the cuff 10, under the bottom arm 14, through a washer 42, a first bearing 40a, a gasket 38, the top arm 12, and securing onto a second bearing 40b. The bottom arm 14 may similarly attach to the cuff 10, wherein a flange bushing 48 may extend through a bushing orifice in the cuff 10, a washer 42, a third bearing 40c, a gasket 38, and a fourth bearing 40d and attach to the bottom arm 14. The bearings and bushings may be freely turning to allow for the arms 12, 14 to pivot freely. The device of the present disclosure may comprise an arm made of multiple portions, such as the top arm 12 and the bottom arm 14, to provide additional strength and stability as well as causing the cuff 10 to remain at a constant angle as it is lowered onto the user's foot. However, more arm portions may be used.

As shown in the Figures, the top arm 12 may attach to the pedal 78 as follows. A first end of a rod 46 may extend through a washer 42 and attach to an inner surface of the top arm 12. An end of the rod 46 distal from the top arm 12 may extend through the right panel 24, the foot flap 30, a pair of rod bearings 40e, a main return spring 54, a cam washer 56, a cam lock 66, a piece of tubing 44, a cuff return spring 34, and a third rod bearing 40f and attach to an inner surface of the left panel 26, such as an inner surface of the left panel 26 proximate to the back panel 22. Rod screws 50 may attach the rod 46 to the right panel 24, the foot flap 30, and the cam lock 66, such that when the user steps on the foot flap 30, it rotates causing the rod 46 to rotate, which in turn causes the cam lock 66 to engage and the top arm 12 to shift forward toward a user's toes, in turn causing the cuff 10 to lock down on the user's foot.

Figure 12:
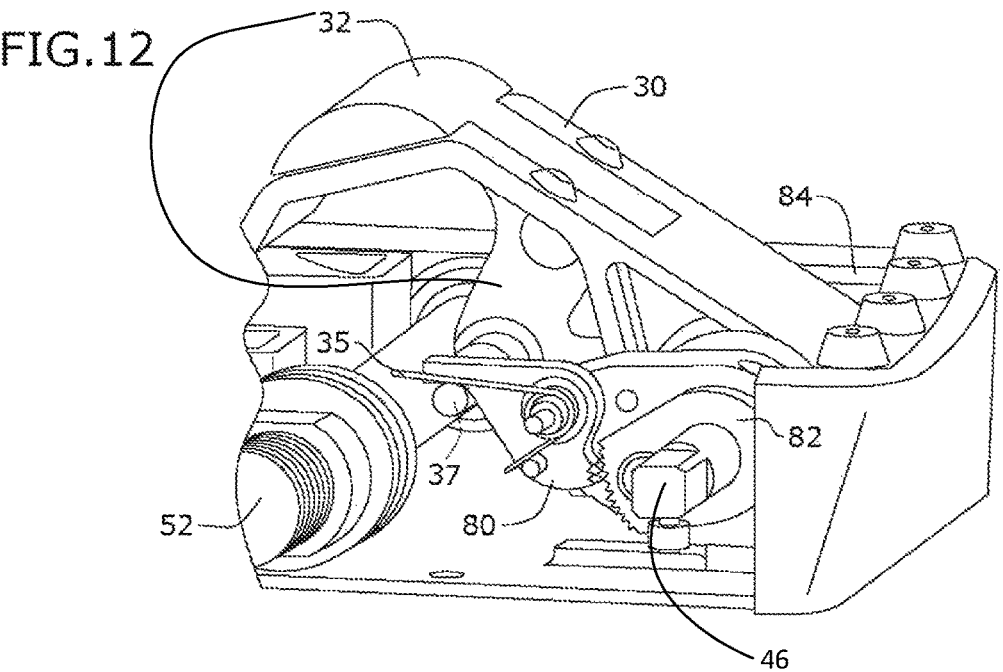
FIG. 12 is a detail view of one embodiment of the present disclosure.
Figure 13:
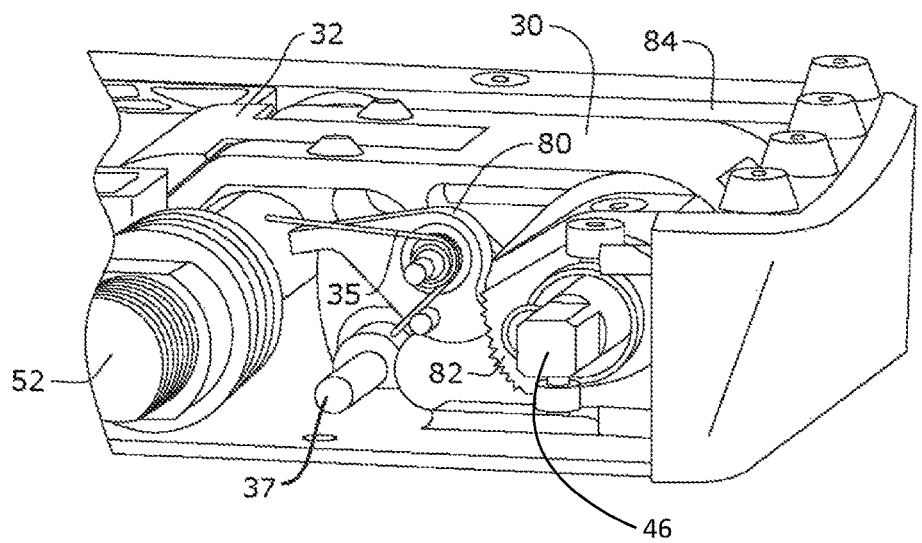
FIG. 13 is a detail view of one embodiment of the present disclosure.

As shown in FIGS. 12 and 13, the trigger 32 may be attached to a trigger pin 37. The trigger pin 37 may be, in turn, attached to a pawl 80 that is configured to engage with a sector gear 82. The sector gear 82 may be attached to the rod 46 such that, when the pawl 80 is engaged with the sector gear 82, the rod 46 cannot rotate, thus securing the cuff 10 in the clamped configuration on a user's foot.

The different plates 16, 18 and panels 20, 22, 24, 26 may attach to one another using any suitable fasteners and, in embodiments, attach to one another using panel pins 28.

When the clamping mechanism is unlocked, the cuff 10 is raised up by, for example, the counter clockwise rotation of the rod 46. The force to rotate the rod 46 counter clockwise may come from the main return spring 54 releasing its tension. When the clamping mechanism is unlocked, the foot flap 30 may be raised up by rotation of the rod 46. The force to rotate the rod 46 may come from the main return spring 54 releasing its tension. When the clamping mechanism is unclamped, the pawl 80 may be held away from the sector gear 82, allowing rod 46 to rotate. A trigger pin 37 attached to the trigger 32 may pull the pawl 80 away from the sector gear 82 and open the pawl release spring 35, as shown in FIG. 12, when the trigger 32 is allowed to rise up and away from the pedal base 84. The force to raise the trigger 32 may come from the main return spring 54 releasing its tension.

Normally, while in operation, the trigger 32 is held down by the user's foot being in the clamping mechanism. As the rider pulls his or her foot rearward or sideways, the trigger 32 is allowed to rise, and the trigger pin 37 pulls the pawl 80 away from the sector gear 82, as shown in FIG. 12, which allows the rod 46 to rotate, releasing the cuff 10 and raising the foot flap 30. In embodiments, the pawl 80 may rotate about 30 degrees, and thus pull away from the sector gear 82, when the trigger 32 rises.

The various components of the device of the present disclosure may be made using any suitable or desired materials, such as from a strong and lightweight material, such as aluminum, plastic, or carbon fiber. The components do not all need to be made of the same material, but they may be in some embodiments.

To use the device of the present disclosure, a user would attach it to a crank arm on a bicycle or to any other equipment requiring a foot pedal or foot platform. The user may then place his or her foot on the pedal base 84, using his or her foot to press down on the trigger 32, causing the cuff 10 to clamp down on his or her foot. The user may then pedal as normal or otherwise use the device or piece of equipment with his or her foot held securely in place. To release his or her foot, the user may simply pull the foot sideways out of the cuff 10 (away from the top arm 12 and bottom arm 14) or rearward out of the cuff 10.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A clamping and locking device with an auto-release, the device comprising:
   a pedal comprising a pedal base having a top plate, a first panel extending from a first side edge of the top plate, and a second panel extending from a second side edge opposing the first side edge of the top plate;
   a main drive pin coupled to the pedal at the first panel and the second panel with a pair of pin bearings allowing rotation of the pedal relative to the main drive pin;
   a rod separated from the main drive pin and coupled to the pedal at the first panel and the second panel with a pair of rod bearings allowing rotation of the rod relative to the pedal;

an arm comprising a first arm end coupled to a portion of the rod extending through the second panel;

a cuff attached to a second arm end of the arm, the cuff configured to wrap over top of a shoe; and a trigger coupled to the rod and the trigger biased to extend upward through an opening of the top plate by a torsion spring, the trigger operatively attached to the arm through coupling to the rod such that, responsive to stepping on the trigger, the arm causes the cuff to lock down onto the shoe.

2. The clamping and locking device of claim 1, wherein the pedal base comprises:

the top plate;

a front panel extending downward from the top plate;

a back panel extending downward from the top plate opposite the front panel; and a bottom plate attached to a bottom respective edge of each of the front panel, the first panel, the second panel, and the back panel.

3. The clamping and locking device of claim 2, wherein the back panel comprises a triangular shaped tab.

4. The clamping and locking device of claim 1, wherein the arm comprises a top arm and a bottom arm, each attached to the cuff.

5. The clamping and locking device of claim 4, wherein:

the main drive pin extends from an inner surface of the first panel through a first pin bearing of the pair of pin bearings and a pin gasket, under the trigger, through the second panel, through a first pin washer, through a second pin bearing of the pair of pin bearings, under the cuff, and attaches to the bottom arm.

6. A clamping and locking device for securing a shoe, the device comprising:

a pedal comprising a pedal base having a top plate, a first panel extending from a first side edge of the top plate, and a second panel extending from a second side edge opposing the first side edge of the top plate;

a main drive pin coupled to the pedal at the first panel and the second panel with a pair of pin bearings allowing rotation of the pedal relative to the main drive pin;

a rod coupled to the pedal at the first panel and the second panel with a pair of rod bearings allowing rotation of the rod relative to the pedal;

an arm comprising a first arm end coupled to a portion of the rod extending through the second panel;

a cuff attached to a second arm end of the arm; and a trigger coupled to the rod and the trigger biased, in a baseline state, to extend upward through an opening of the top plate by a torsion spring, the trigger comprising a trigger pin protruding from a region of the trigger near the first trigger end;

a pawl retained within the pedal along a path of motion of the trigger pin; and a sector gear coupled to the rod;

wherein, the trigger is transitionable between the baseline state and a locking state, wherein in the baseline state the trigger pin contacts the pawl and the pawl is disengaged from the sector gear, and in the locking state the trigger pin is separated from the pawl and the pawl engages the sector gear, thereby locking a position of the cuff coupled to the rod.

* * * * *